No. 817,444. PATENTED APR. 10, 1906.
F. W. PARSONS.
RAILWAY COUPLING AND DRAW BAR.
APPLICATION FILED MAR. 8, 1905.

2 SHEETS—SHEET 1.

WITNESSES
A. T. Palmer
S. B. Shackford

INVENTOR
FRANCIS W. PARSONS
BY Edward S. Beach
ATTY.

No. 817,444. PATENTED APR. 10, 1906.
F. W. PARSONS.
RAILWAY COUPLING AND DRAW BAR.
APPLICATION FILED MAR. 8, 1905.

2 SHEETS—SHEET 2.

WITNESSES
A. T. Palmer
S. B. Shackford

INVENTOR
FRANCIS W PARSONS
BY Edward S. Beach
ATTY.

UNITED STATES PATENT OFFICE.

FRANCIS W. PARSONS, OF OSTERVILLE, MASSACHUSETTS.

RAILWAY COUPLING AND DRAW-BAR.

No. 817,444.     Specification of Letters Patent.     Patented April 10, 1906.

Application filed March 8, 1905. Serial No. 249,132.

*To all whom it may concern:*

Be it known that I, FRANCIS W. PARSONS, a citizen of the United States, residing at Osterville, in the county of Barnstable and State of Massachusetts, have invented certain new and useful Improvements in Railway Couplers and Draw-Bars, of which the following is a specification, reference being had therein to the accompanying drawings.

Figure 1:
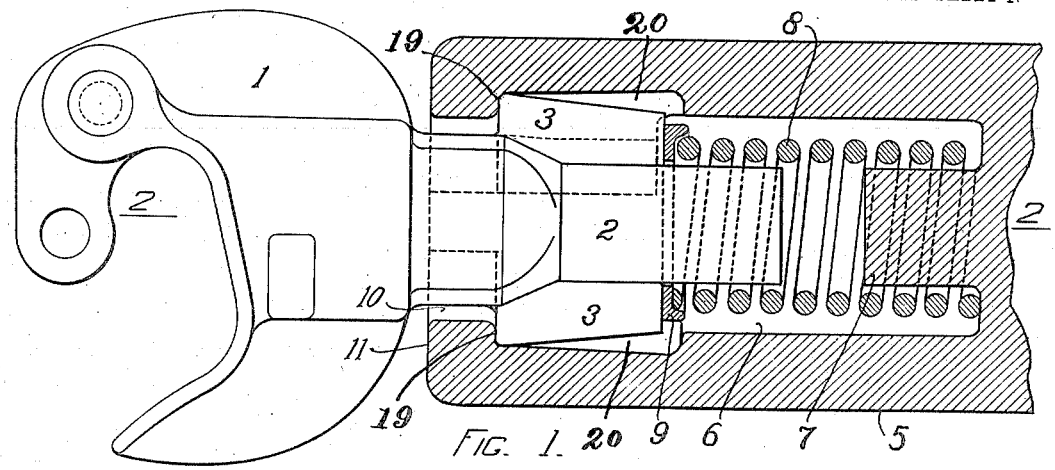
Figure 2:
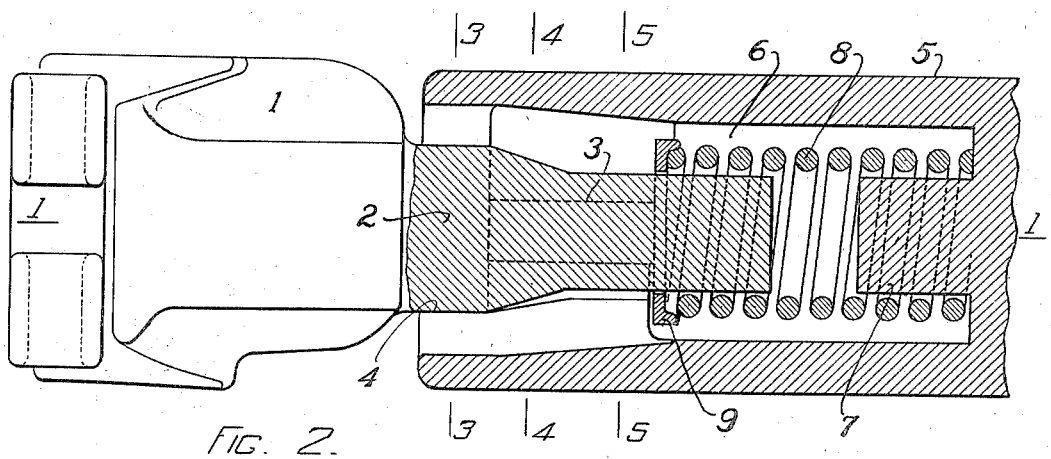
Figure 3:
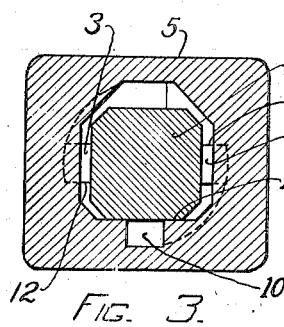
Figure 4:
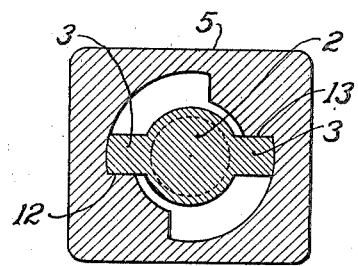
Figure 5:
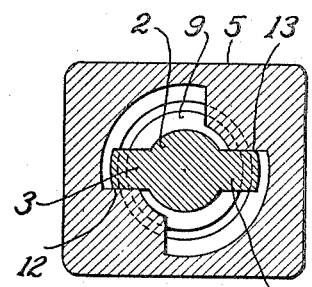
Figure 6:
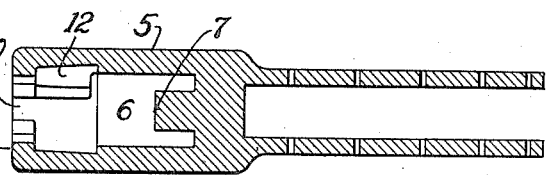
Figure 7:
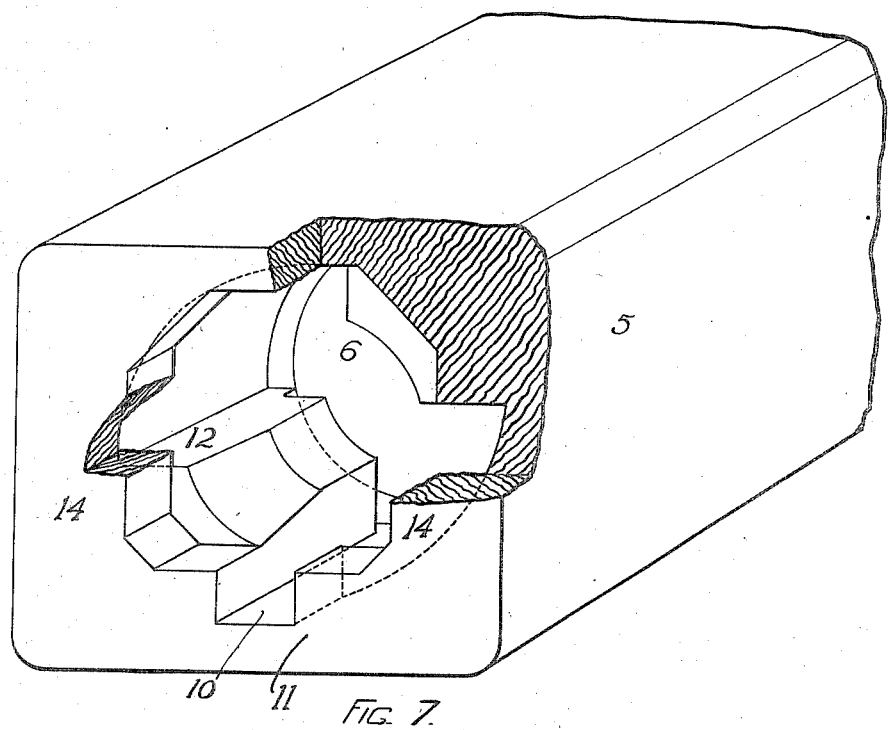
Figure 8:
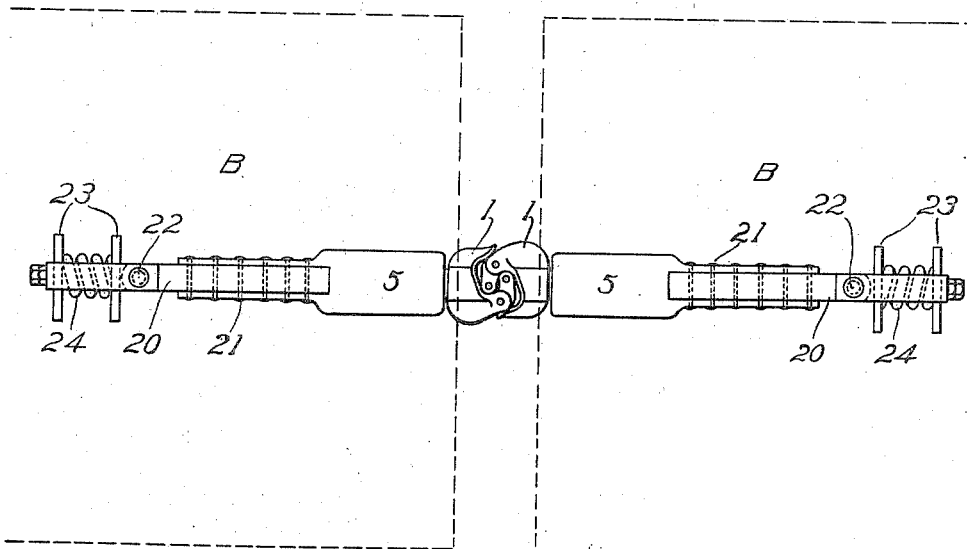

Figure 1 shows in top plan view my new coupler-head and a part of its draw-bar, the coupler-head being in place and the draw-bar head in horizontal lengthwise section. Fig. 2 is a vertical elevation of what is shown in Fig. 1 and is partly in cross-section at a line corresponding to line 2 2 of Fig. 1. Figs. 3, 4, and 5 are cross-sections at lines corresponding, respectively, to lines 3 3, 4 4, and 5 5 of Fig. 2. These views illustrate the interlock of the coupler-head shank with the draw-bar head, the outer end of which is chambered to receive said coupler-head shank and to interlock therewith. Fig. 6 is a sectional view at a line corresponding to line 1 1 of Fig. 2 of the draw-bar head shown attached to the draw-bar. Fig. 7 is a perspective view, partly in section. showing the interior configuration of the draw-bar head. Fig. 8 is a top plan view showing a pair of draw-bars with their coupler-heads interlocked and applied to cars in accordance with my invention.

The object of my invention is to produce car-coupling devices which will permit trains to run on shorter curves than heretofore possible without danger of breaking couplers or derailing cars and in which broken coupler-heads may be quickly replaced.

In the drawings, 1 is a coupler-head, the outer part of which may be of any suitable type. In accordance with my invention I form the coupler-head with a short shank 2, which is adapted (as shown or otherwise) to be thrust into the open front end of a draw-bar head, turned ninety degrees therein, and then interlocked therewith and therein have a wrist-like movement in a horizontal plane. In the present form of my invention shank 2 has side wings 3 3 diametrically opposite each other and in the plane of the upper and under faces of the coupler-head—*i. e.*, they are in the horizontal position with the coupler-head when the latter is in working position. Shank 2 has a flat bearing 4 on its under surface for a purpose stated below.

The draw-bar head 5 may be of any suitable shape so long as it coöperates with the coupler-head shank on the interlocking principle of my invention, in the present form of which the draw-bar head has a short front end recess or chamber 6, on the inner end wall of which is a forwardly-extending bottom lug 7 for the helical spring 8, which is mounted in the chamber between the inner wall and a washer 9, carried by the shank of the coupler-head and abutting against the inner ends of wings 3 3. In this way the coupler-head and draw-bar head are yieldingly connected in respect of their endwise movements in relation to another car. The mouth of chamber 6 has a bottom groove 10 in the under wall 11, which overhangs the chamber proper. The height of the space between the bottom of groove 10 and the opposite wall of the chamber is slightly greater than the diametric width of the coupler-head shank from side edge to side edge of wings 3 3, and groove 10 extends through wall 11 in the direction of the length of the draw-bar. Consequently the shank of the coupler-head may be inserted into the chamber, one of the wings 3 being slid through the groove 10. A quarter-turn will then bring one of the wings 3 down on the horizontal lengthwise shoulder 12 of the chamber and bring the other wing up against the corresponding shoulder 13, whereby the coupler-head will be brought into its working position. The flat bearing 4 of the coupler-head will then rest on the upper sides of the wall 11 on both sides of the groove 10, and the coupler-head shank and the draw-bar head may here have relative sliding movements when the train curves, as will be plain from Fig. 3.

The wall 11 is continued upwardly on both sides at 14 14, where it overhangs or forms the front end wall of chamber 6, forming what may be called the "vertical draft-walls" of the draw-bar head. The inner surfaces of these side portions 14 14 of wall 11 (see Figs. 7 and 3) form vertical bearings 19 for the outer ends of wings 3 3, as shown in Fig. 1, when the coupler-head is in working position. The diametric width of the coupler-head from side edge to side edge of the wings 3 3 is diminished inwardly by the inward taper of the side edges of the wings, as shown in Fig. 1, and consequently a certain amount of lateral play in a horizontal plane is permitted to the coupler-head in the spaces 20 between the wings and the opposed walls of that part of chamber 6 which receives the winged portion of the coupler-head, and when the coupler-head is given a quarter-turn, as stated, the outer ends of wings 3 3 bear on the vertical bearings 19 19, and the coupler-head and draw-bar head are thereby coupled. Said two heads are thus interlocked under pressure of the spring and cannot be accidentally displaced except by great force. The coupler-heads may be inserted by means of a jack or other power and turned by means of a jack or the like. If a coupler-head gets broken during a run, the broken head may be readily removed and replaced with a new one.

When opposed ends of cars are coupled by this invention, strains and jolts of the train will not tend to turn the individual coupler-heads in the reverse or unlocking direction, because any such movement of either interlocking coupler-head will tend to give a reverse movement to the other and keep the wings 3 3 of the latter in place against its shoulders 12 and 13.

The draw-bar head is made fast to the outer end of any suitable draw-bar 20, as by bolts 21, the inner end being connected with the car-body in any suitable manner, as at the usual pivotal connection 22, which, with the cross-bars 23 23 and intermediate spring 24, constitute one of many old and well-known modes of forming and connecting the inner end of the draw-bar to the car-body B.

My invention may be embodied in many different forms other than that shown.

What I claim is—

1. In a car-coupling device, the combination of a coupler-head having a shank with a draw-bar head having in its outer end a chamber to receive said shank; the shank and chamber being respectively formed with complementary means whereby the coupler-head shank and draw-bar head are interlocked when the coupler-head shank is inserted and turned in the chamber; said interlocking means permitting movement in a horizontal direction of the coupler-head and draw-bar head, one in relation to the other.

2. The combination with a chambered draw-bar head having within the chamber horizontal shoulders, extending in the direction of the length of the draw-bar, and vertical bearings at the front end of the chamber of a coupler-head having a shank provided with diametrically opposite wings which engage with said shoulders and bearings; and a spring operatively mounted between the inner end wall of the chamber and the inner ends of said wings; the coupler-head shank being turnable in and thereby withdrawable from the draw-bar head.

3. The combination of a coupler-head having a shank with a draw-bar having a chamber; interlocking devices on said shank; within the chamber, means adapted to interlock with said devices when the shank is inserted; within the chamber, means adapted to coöperate with said devices, when the shank is in working position, for holding the coupler-head and draw-bar head in pulling connection; the coupler-head and draw-bar head then being movable one in relation to the other in a horizontal plane; and a spring within the chamber between the inner end of the chamber and the coupler-head.

In testimony whereof I affix my signature in presence of two witnesses.

FRANCIS W. PARSONS.

Witnesses:
EDWARD S. BEACH,
E. A. ALLEN.